United States Patent
Kils et al.

(10) Patent No.: US 11,781,610 B2
(45) Date of Patent: Oct. 10, 2023

(54) SYSTEMS FOR LINE DEVICE

(71) Applicant: CMC Rescue, Inc., Goleta, CA (US)

(72) Inventors: Ole Kils, Goleta, CA (US); Tyler J. Mayer, Carpinteria, CA (US); Alex Hurd, Lompoc, CA (US); Shaun Reed, Santa Barbara, CA (US)

(73) Assignee: CMC RESCUE, INC., Goleta, CA (US)

( * ) Notice: Subject to any disclaimer, the term of this patent is extended or adjusted under 35 U.S.C. 154(b) by 28 days.

(21) Appl. No.: 17/351,962

(22) Filed: Jun. 18, 2021

(65) Prior Publication Data
US 2022/0403898 A1 Dec. 22, 2022

(51) Int. Cl.
*F16D 63/00* (2006.01)
*F16D 59/00* (2006.01)
*F16D 127/00* (2012.01)
*F16D 121/00* (2012.01)

(52) U.S. Cl.
CPC .......... *F16D 63/008* (2013.01); *F16D 59/00* (2013.01); *F16D 2121/005* (2013.01); *F16D 2127/005* (2013.01)

(58) Field of Classification Search
CPC ............ F16D 63/008; A62B 1/10; A62B 1/14
See application file for complete search history.

(56) References Cited

U.S. PATENT DOCUMENTS

| | | | |
|---|---|---|---|
| 6,056,086 A | 5/2000 | Gortan et al. | |
| 2005/0057051 A1 | 3/2005 | Bartos | |
| 2014/0020988 A1 | 1/2014 | Casebolt et al. | |
| 2015/0040814 A1 | 2/2015 | Volkwein | |
| 2017/0260762 A1* | 9/2017 | Ostrobrod | A62B 35/0081 |
| 2018/0231075 A1* | 8/2018 | Mahana | F16D 65/028 |
| 2018/0333596 A1* | 11/2018 | Kils | A62B 1/10 |

FOREIGN PATENT DOCUMENTS

| | | | | |
|---|---|---|---|---|
| DE | 102018102325 A1 * | 8/2019 | | A62B 1/14 |
| DE | 202018103664 U1 * | 11/2019 | | A63B 29/02 |
| GB | 2517675 A * | 3/2015 | | A62B 1/14 |
| JP | 3701340 B2 | 9/2005 | | |
| WO | WO-2014205479 A1 * | 12/2014 | | A62B 1/14 |
| WO | WO-2015074105 A1 * | 5/2015 | | A62B 1/14 |

OTHER PUBLICATIONS

ISA Korean Intellectual Property Office, International Search Report and Written Opinion Issued in Application No. PCT/US2022/073062, dated Oct. 26, 2022, WIPO, 12 pages.

* cited by examiner

*Primary Examiner* — Melody M Burch
(74) *Attorney, Agent, or Firm* — McCoy Russell LLP

(57) ABSTRACT

Methods and systems are provided for a device. In one example, the device is configured to automatically grab and slip a line. The device is further configured to decrease degradation to the line by limiting a rotation of the device via contact with the line.

17 Claims, 4 Drawing Sheets

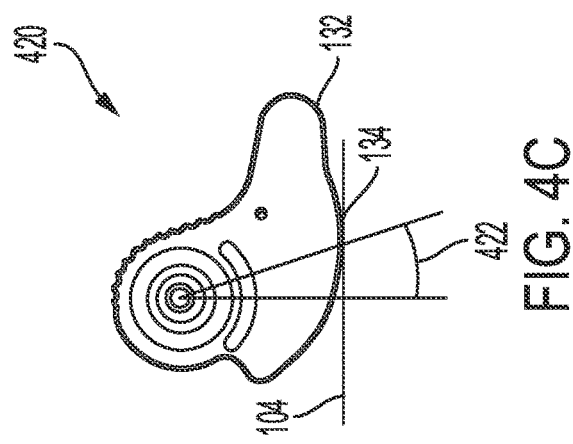
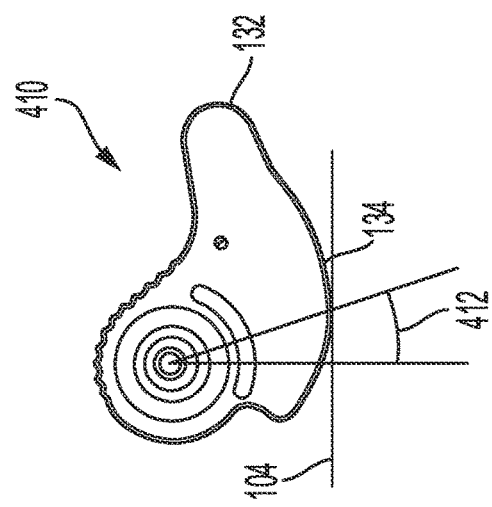
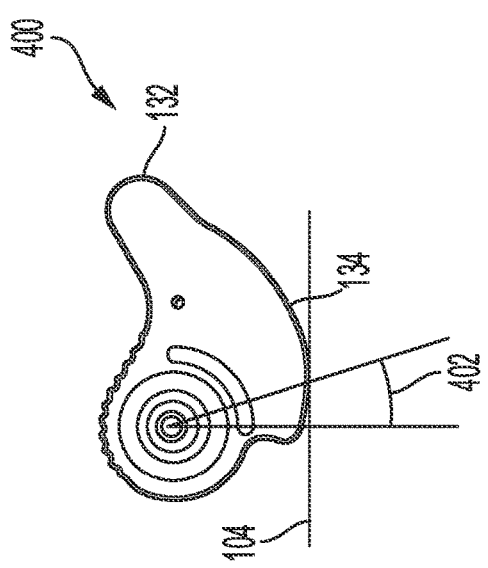
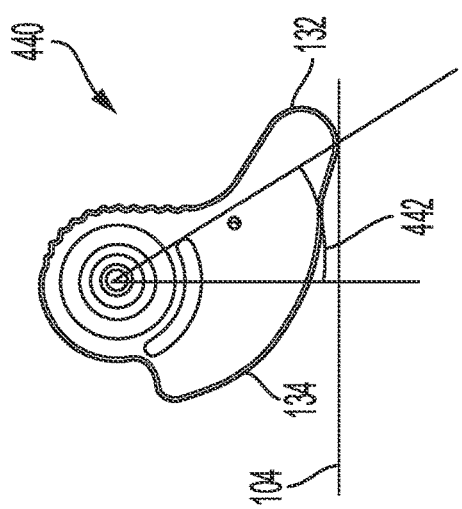
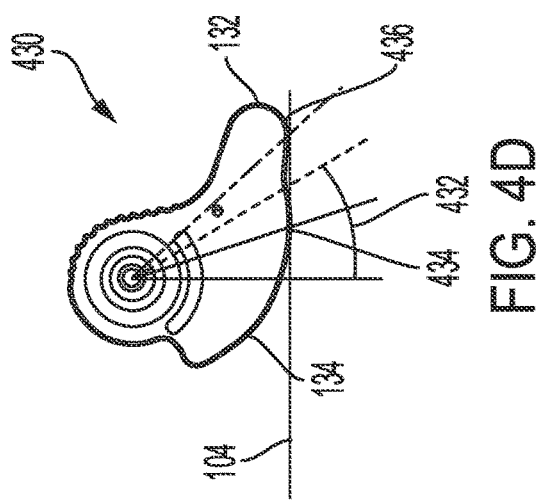

SYSTEMS FOR LINE DEVICE

FIELD

The present description relates generally to a line grab device.

BACKGROUND/SUMMARY

A line grabbing device may be a device configured to block and allow slipping of a line at a pre-determined load. The line grabbing device may assist a user in ascending or descending by grabbing a line via a cam or a knot. Examples of line grab devices may include a Prusik knot, ascender devices, work positioning devices, back up devices, and the like.

The Prusik knot, which attaches a loop of rope around a line may be the simplest configuration of a line grab device. The Prusik knot is relatively inexpensive, but may be vulnerable to incorrect installation and may be troublesome to set-up. Additionally, the Prusik knot may be inefficient when sliding it along a host line due to friction and may be difficult to reset to a desired position after being heavily loaded or following a slip event. During the slip event, the Prusik knot may degrade the host line and/or the lines may weld together and become difficult to separate. Furthermore, due to a variability of peak slip forces, it may be difficult to configure a Prusik knot for a variety of slip events.

Other examples of line grabbing device include non-levered and levered camming devices. In each of these examples, the cams may be spring driven and toothed in varying degrees of aggressiveness. For example, in the non-levered camming device, teeth thereof may be relatively sharp and include an acute toothing angle. The toothed cam devices may prevent slip between the rope and the cam in overload situations that may cause degradation to the host rope. In the levered camming device, it may include duller teeth with a larger toothing angle for handling higher loads. The duller teeth may decrease degradation to a line relative to sharper teeth while the cam demands a greater amount of force on the host line to grab it. A levering becket may be coupled to the cam to provide a sufficient force thereto such that a desired gripping may occur.

However, the inventors have identified some issues with the approaches described above. For example, levered camming devices may not slip under overload conditions and degrade the host line. Some mechanical devices may automatically release the line during an overload scenario, but these devices may not be configured to automatically re-grab the line. Thus, there is a demand for a line grabbing device configured to automatically slip and grab line without degrading the line due to over-rotation of the cam.

In one example, the issues described above may be addressed by a device comprising a cam configured to increase a camming angle as rotation of the cam increases. In this way, the cam may apply higher force to grab the line at higher line loads. The cam may then slip at line loads above or equal to a threshold load and re-grab the line at loads below the threshold load. The threshold load may be based on a non-zero, positive number. A line load, herein, load, is defined as a force applied to the line by the device (e.g., a line grabbing device). The line may be under varying amount of tension even before the device is coupled to it.

As one example, a shape of the cam deviates from logarithmic, which allows the cam to increase the camming angle at various cam positions. The cam may grab the line at a low cam angles and continue to grab the line as the load and cam rotation increases. Upon rotating a threshold amount where a threshold load is reached, the camming angle, although increased, may be too low to grab the line at loads greater than or equal to the threshold load, thereby no longer grabbing the line, resulting in a slip event. The cam may re-grab the line in response to the load decreasing to a load less than the threshold load. The device, along with the cam, are configured to grab and slip line automatically without input from a user.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4E illustrate various camming angles at different positions of the cam.

FIGS. 1 through 5 are shown approximately to scale, however, other dimensions may be used if desired.

DETAILED DESCRIPTION

Figure 1:
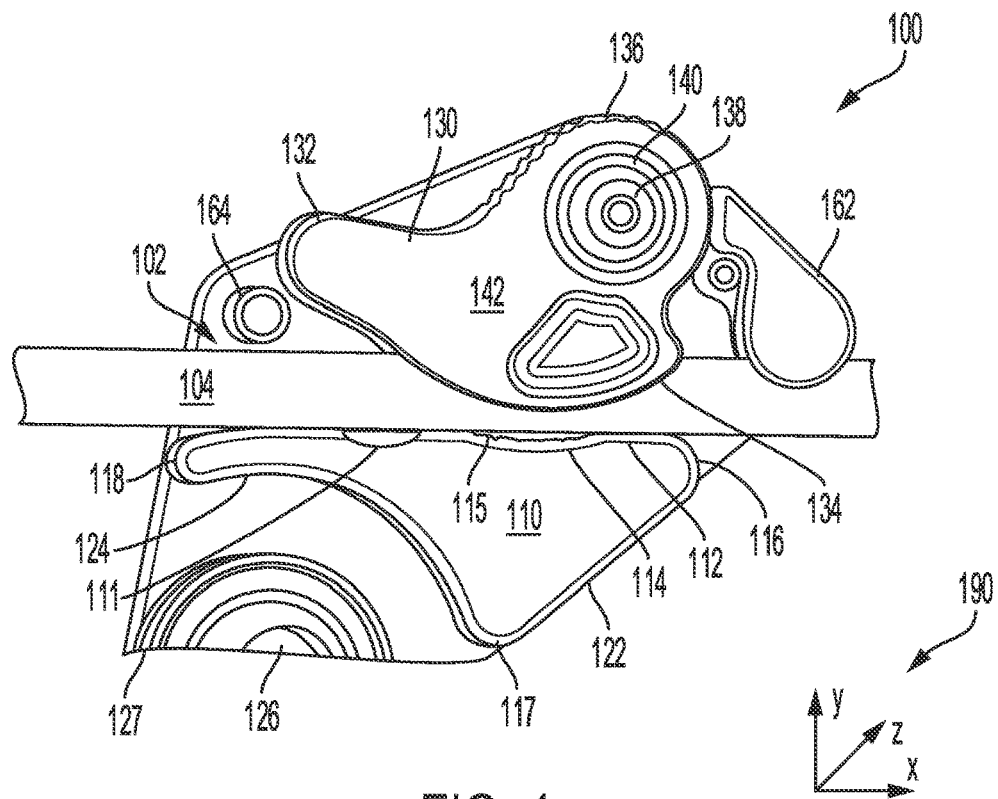
FIG. 1 illustrates a first view of a line grab device grabbing a line.
Figure 2:
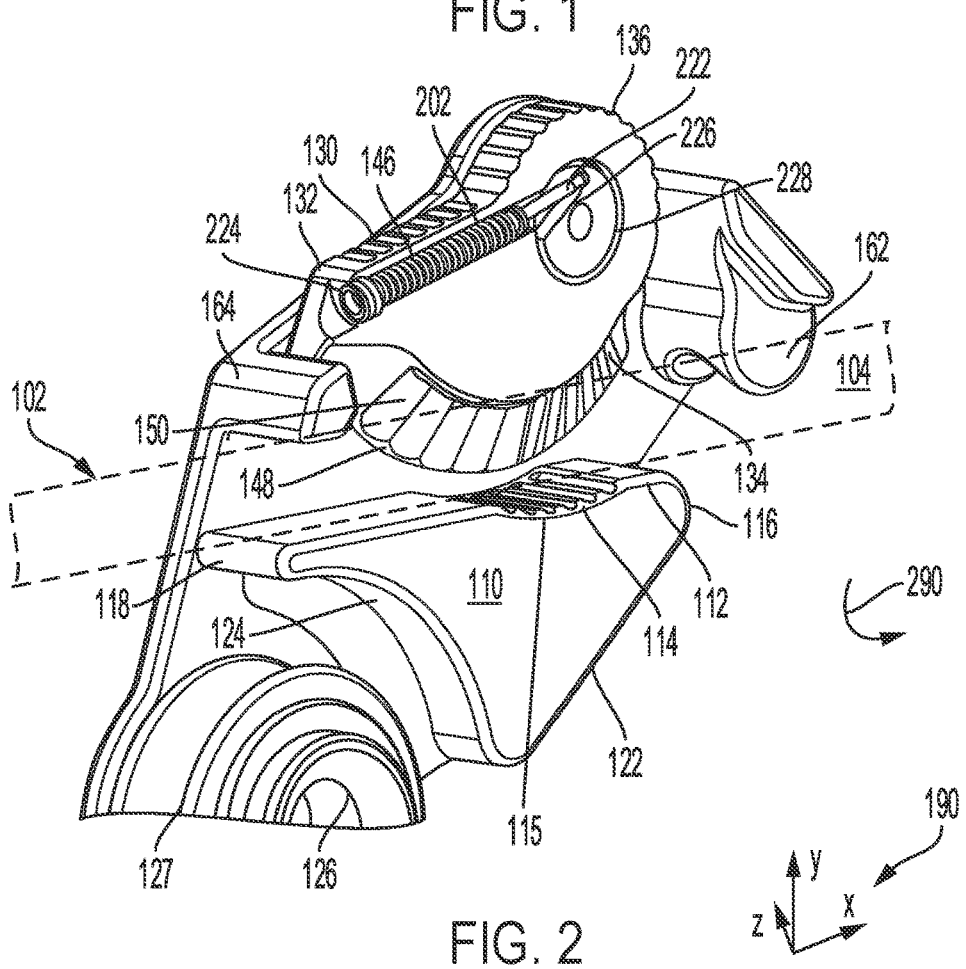
FIG. 2 illustrates a second view of the line grab device with an interior of a cam of the line grab device revealed.
Figure 3A:
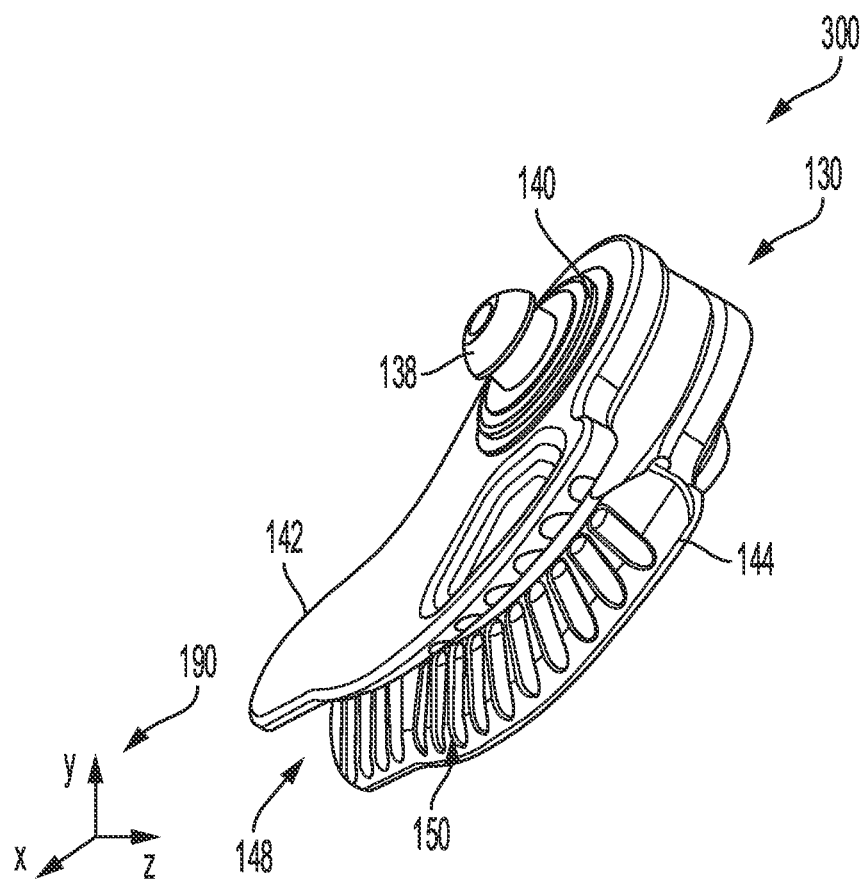
FIG. 3A illustrates a groove of the cam.
Figure 3B:
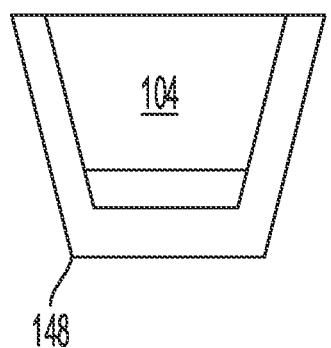
FIG. 3B illustrates a shape of the line in the groove.
Figure 5:
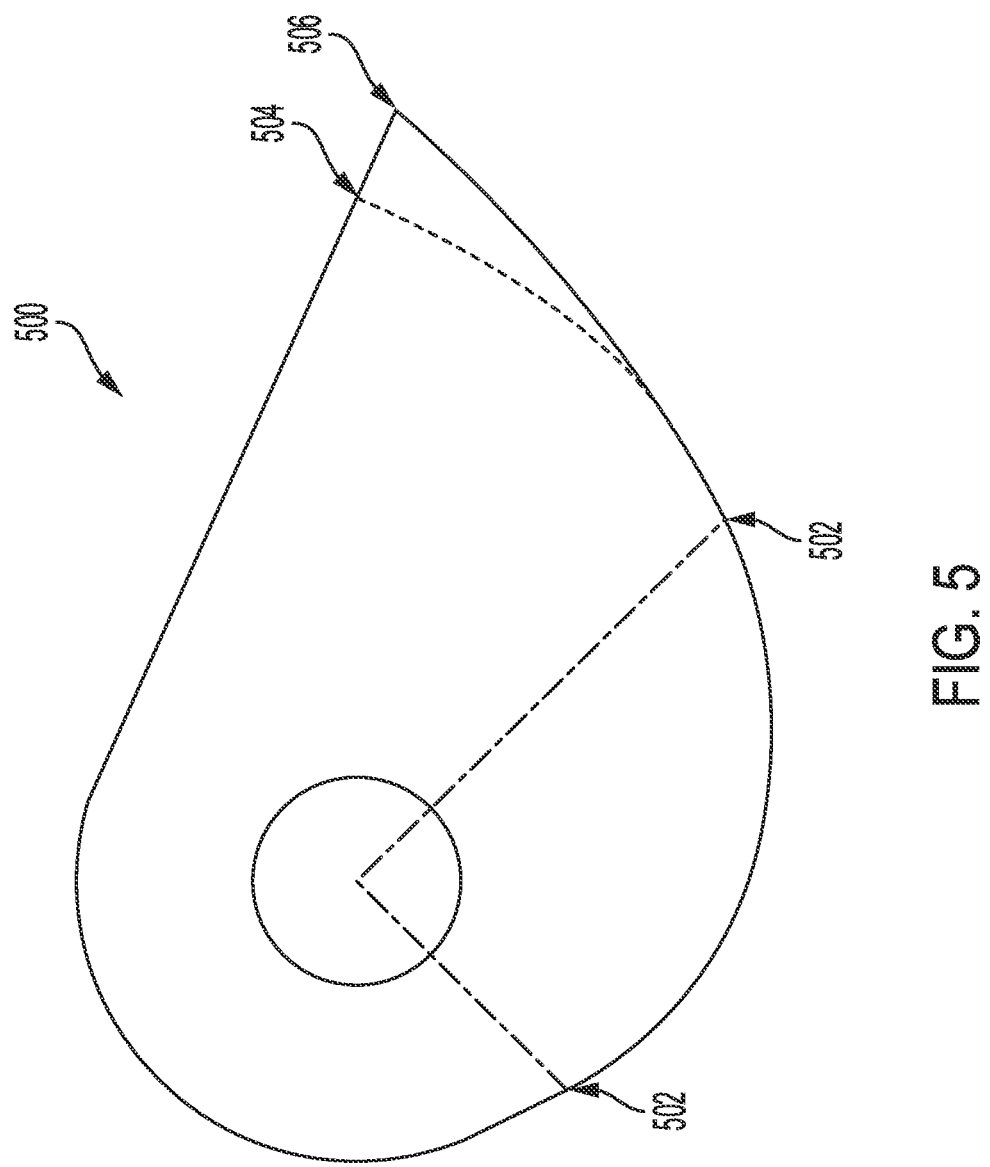
FIG. 5 illustrates an alternative shape of a cam of the line grab device.

The following description relates to a line grab device, as illustrated in FIG. 1. An interior of a cam of the line grab device is illustrated in FIG. 2. The cam may comprise a groove configured to pinch the line, as illustrated in FIGS. 3A and 3B. FIGS. 4A through 4E illustrate various camming angles at different rotational positions of the cam. FIG. 5 illustrates an alternative shape of a cam of the line grab device.

In one embodiment of the present disclosure, a device configured to grab a line and slip at a pre-determined load. The device may prevent overloading of a line system and decrease a likelihood of degradation to the line due to excess tension. The device may slip more predictably than rope knots used as a line-grabbing device or the levered and unlevered examples described above. Additionally, set up of the device may be faster, more reliable, and more efficient than the rope knot.

The device, in one example, is a load limiting line grab configured to slip at or above the threshold load. The device includes a spring, an unlevered cam, and a tail. The cam may comprise a groove including a V-shape. The groove may increase friction applied to the line and force the cam to rotate with increased load. In response to the upper threshold load being met or exceeded, the tail may contact the line blocking further rotation of the cam. This may stop the cam from applying more friction to the line, which may prevent degradation to a host line or overload of a line system. The load overcomes the friction of the camming device and initiates a slip event. Once the load decreases below the threshold load, the friction of the camming device is sufficient to hold the load and re-grabs the line. The slipping and grabbing may occur automatically without a user input. As such, the slip does not cause a complete release of load but an upper limit of the load applied to the line.

Herein, terms cam angle and camming angle are used. A cam angle is defined as an angle of rotation of the cam and the camming angle is defined as the angle between a net or an average contact point of the cam (e.g., a centroid of pressure distribution) and a line normal to the line that passes through a center of rotation of the cam.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a device 100. In one example, the device 100 is a line grab device. In some examples, additionally or alternatively, the device 100 may be a standalone line grab, a progress capture pulley, an ascender, a working position device, or a back-up device. An axis system 190 is shown comprising three axes, namely an x-axis parallel to a vertical direction, a y-axis parallel to a horizontal direction, and a z-axis parallel to a transverse direction, normal to the x- and y-axes. It will be appreciated that the device 100 may interact with a line 104 along any of the axes of the axis system 190.

A line path 102 may be configured to receive the line 104. In one example, the line 104 is a rope. The line path 102 may be defined by a cam 130 and a baseplate 110. The line 104 may be selected from a plurality of lines including a variety of lengths, thicknesses (e.g., diameters), and constructions. For example, the line 104 may include one or more of a braided construction, a twisted construction, a liner or a mantle surrounding a core construction, a static construction, a dynamic/flexible construction, a synthetic material, such as nylon or polyester, and a natural material. In this way, the device 100 may be used with a variety of lines.

The baseplate 110 may include a first surface 112, a second surface 122, and a third surface 124. The first surface 112 may transition to the second surface 122 via a first contoured edge 116. The second surface 122 may transition to the third surface 124 via a second contoured edge 117. The third surface 124 may transition to the first surface 112 via a third contoured edge 118. Each of the contoured edges may be curved with no normal angles, thereby smoothing the corners which may prevent the baseplate 110 from catching onto the line 104 or an article of clothing of a user.

The first surface 112 and the second surface 122 may be substantially planar. The third surface 124 may comprise a curved shape. In one example, the third surface 124 may curve toward the first surface 112 and away from an eyelet 126. In one example, the eyelet 126 may be configured to be part of a pulley including a sheave 127 supported by a bearing. By doing this, a user may utilize a mechanical advantage system. receive a second line, a carabiner, or other similar device. The eyelet 126 may be shaped via the sheave 127 configured to rotate based on a movement of the user with respect to the device extending through the eyelet 126. By doing this, an orientation of the device 100 may be maintained as an orientation of the user may change during a descent or an ascent.

The first surface 112 may deviate from planar adjacent to the third contoured edge 118. In one example, the first surface 112 curves away from the line path 102. Thus, the third contoured edge 118 may extend in a direction away from the line path 102 and toward the sheave 127.

The baseplate 110 may further include a first recess 114 adjacent to the cam 130. The first recess 114 may curve toward the second contoured edge 117, away from the cam 130. In one example, the first recess 114 may include a conformal shape relative to the cam 130. The first recess 114 may increase a contact area in which the line 104 is contacted by the device 100 while introducing an angular deviation of the line path 102. Additionally, shaping the first recess 114 conformal or near conformal may increase the contact area to an entire shape of the first recess 114, which may decrease stress concentrations on the line 104.

The first recess 114 may include a plurality of teeth 115. The plurality of teeth 115 may be identical to one another in size and shape. In one example, the plurality of teeth 115 extend in a direction normal to the line path 102.

The cam 130 may include a tail 132 and a protrusion 134 extending from a body 136. The body 136 may include a fastener 138 extending through an opening of a bearing 140 thereof, wherein the fastener 138 may retain the cam 130 to the device 100 while the bearing 140 may allow the cam 130 to rotate in response to a load applied to the line 104.

The protrusion 134 may comprise a logarithmic shape. That is to say, the camming angle of the cam 130 may be relatively constant when only the protrusion 134 is in contact with the line 104. The cam 130 may deviate from logarithmic at the tail 132, wherein the camming angle may increase due to each of the protrusion 134 and the tail 132 contacting the line 104. This may allow the cam 130 to limit the load applied to the line 104, relative to cams following a logarithmic shape.

A second recess 111 may be along the first surface 112 between the first recess 114 and the third contoured edge 118. In one example, the positioning of the second recess 111 may correspond to a location at which a non-logarithmic portion of the cam 130 may contact the line 104 and press the line 104 against the first surface 112. In one example, the tail 132, which is a non-logarithmic portion of the cam 130 of the example of FIG. 1, may push the line into the second recess 111 and deflect the line before a camming angle effect of the cam grip causes the device 100 to slip. This may create a higher cam rotation and slip force compared to a planar baseplate or a baseplate with only a single recess. If a back-tension is relatively high, then tensile forces in the line may resist deflection into the second recess 111, thereby reducing an effect on slip force compared to a planar baseplate.

A size and a shape of the second recess 111 may be adjusted to enhance the operating conditions of the device 100. A magnitude of an effect of the second recess may be increased by increasing a depth of the recess. Additionally or alternatively, a sensitivity to different level of line tension on a side of the device not tensioned may be adjusted by adjusting a length of the recess along the direction of line path. In one example, increasing the length of the recess may decrease its sensitivity and decreasing the length of the recess may increase its sensitivity. Herein, sensitivity may refer to the magnitude of the effect as a function of the amount of line tension of a side of the device not tension by the device. For example, a shorter recess may allow the line to enter only when a lower tension is present. A longer recess may allow the line to enter the recess when higher amounts of tension are present relative to the shorter recess. Additionally or alternatively, the second recess 111 may include a shape similar to the first recess 114, wherein the second recess 111 may include a V-shaped groove arranged therein. The second recess 111 may further include, additionally or alternatively, a texturing, such as a plurality of teeth, ribbings, or other non-linear features.

The tail 132 may extend in a direction away from the line path 102 in the position of the cam 130 illustrated in the example of FIG. 1. In one example, the tail 132 is raised relative to other examples of cams. The tail 132 may be configured to initiate slip during some loads imparted on the line 104 by blocking the cam 130 from further rotating. More specifically, the tail 132 is configured to contact the line 104 at relatively high loads. In one example, the tail 132 may contact the line at a first threshold load. The first threshold load may be a non-zero, positive value. Once the load increases above a second threshold load, the cam 130 in combination with the tail 132 may no longer grab the line 104 and the line 104 may slip. If the load decreases below the second threshold load, then the cam 130 may re-grab the line 104. Rotation of the cam 130 based on the load is described in greater detail with respect to FIGS. 4A to 4E. In one example, the second threshold load is a non-zero, positive value. The second threshold load may be greater than the first threshold load. The second threshold load may correspond to a load of the line 104 where friction generated between the cam 130 and the line 104 is insufficient to grab the line 104. Additionally or alternatively, the cam 130 may be configured to slip the line 104 at the second threshold load to mitigate degradation to an outer surface of the line 104. In one example, the slipping of the cam 130 is based on one or more of load, aperture (e.g., opening of the line path 102), and friction.

Said another way, the tail 132 blocks rotation of the cam 130 beyond a threshold position, initiating slip due to the friction applied by the cam 130 being less than the load of the line 104. In this way, the rotation of the cam 130 is limited via the line rather than the device 100 or a component thereof. The device 100 may operate on a variety of lines 104 with different diameters or stiffnesses. The slip forces of the device 100 are therefore more accurate, and the device 100 is more versatile.

Herein, grab refers to the line 104 being lockingly engaged with the device 100 such that the device 100 may not travel in a direction parallel to the line. Slip may refer to the line 104 being released by the device 100 such that the device 100 may travel in the direction parallel to the line 104.

In some examples, the cam 130 may be configured with a spiral shape, as shown in FIG. 5. As the cam rotates, portions of the spiral with a greater radius may contact the line. In one example, the radius of the spiral cam may increase at a rate greater than logarithmic, thereby causing a gradual increase in a camming angle with an increase in cam rotation. For example, section 502 of the embodiment 500 of a device, which may be used similarly to the device 100 of FIG. 1, may include a logarithmic shape. Dashed line 504 illustrates a continuation of the logarithmic shape. However, the spiral shaped cam of the embodiment 500 includes a shape with an increasing camming angle due to an increasing radius section 506 beyond the section 502. In this way, the increasing radius section 506 of the spiral-shaped cam of FIG. 5 may correspond to a non-logarithmic section of the cam. That is to say, the cam angle of the device 100 of FIG. 1 and the device of embodiment 500 may comprise a relatively constant camming angle until the tail 132 or the increased radius section 506 contacts the line 104, wherein the camming angle may increase in a stepped manner. The cam may be alternatively configured to include a spiral shape with a radius from a pivot point of the cam (e.g., bearing 140) increasing in a direction of increasing rotation of the cam 130. As portions of the spiral cam with larger radii contact the line, the camming angle increases, such that the camming angle of the spiral shaped cam may gradually increase throughout a rotation of the cam.

The cam 130 further comprises an outer surface 142. In the example of FIG. 1, the outer surface 142 covers interior components of the cam 130 while further obscuring a portion of the line 104. Turning to FIG. 2, it shows an embodiment 200 of the device 100 with the outer surface 142 of the cam 130 hidden. As such, components previously introduced are similarly numbered in this and subsequent figures. An inner body 144, a spring 146, and a groove 148 of the cam 130 are exposed in the example of FIG. 2.

The inner body 144 may comprise a shape similar to the shape of the outer surface 142. In one example, the inner body 144 and the outer surface 142 comprise an apostrophe shape. The apostrophe shape may include a circular portion from which a tail or other element extends, disrupting a shape of the circle. Additionally or alternatively, the inner body 144 and the outer surface 142 may include a spiral shape as described above, or they may include an elliptical shape.

The groove 148 may be cut into a shape of the cam 130 and arranged between the outer surface 142 and the inner body 144. The groove 148 may include a plurality of teeth 150 configured to increase friction against the line 104, thereby allowing the cam 130 to grab the line 104 in response to loads below the second threshold line load. The groove 148 and the plurality of teeth 150 are described in greater detail with respect to FIG. 3.

The spring 146 and spring plunger 222 may be arranged within a recess 202 of the inner body 144. The spring 146 may be retained within the recess 202 via a spring fastener 224 that is configured to compress the spring 146. The spring plunger 222 is configured to contact the spring on one side, and a cam axle recess 226 in the cam axle 228. The cam axle recess 226 is accessible through a split in the cam bearing 140. This configuration may force the compressed spring 146 to create an overturning moment about the cam axle 228, forcing the cam 130 to rotate anticlockwise towards contact with the rope 104, as shown by arrow 290. The cam axle recess 226 is configured to allow the cam 130 to rotate clockwise sufficiently to enable a user to load and un-load the rope 104.

The device 100 further comprises a guide 162. The guide 162 may be arranged at a portion of the device 100 opposite to a pin 164. Each of the guide 162 and the pin 164 may be configured to block overturning of the line 104. By doing this, the line 104 may not counter-rotate the cam 130.

Turning now to FIG. 3A, it shows a view 300 of the groove 148. As illustrated, the groove 148 is shaped via interior surfaces of the outer surface 142 and inner body 144 of the cam 130. The groove 148 may increase in constriction in a direction away from a line path (e.g., line path 102 of FIGS. 1 and 2).

The groove 148 may include the plurality of teeth 150, which may be substantially identical to one another in size and shape. Additionally or alternatively, teeth of the plurality of teeth 150 may be differently sized and/or shaped from one another without departing from the scope of the present disclosure. Neighboring teeth of the plurality of teeth 150 may be separated via a recess or other indentation. As such, adjacent teeth may not touch one another.

The plurality of teeth 150 may comprise rounded surfaces at which the teeth may contact the line. The rounded surface may reduce stress concentrations on the line and increase its longevity.

In one example, the groove 148 is a V-shape. Additionally or alternatively, in some examples, the groove 148 may include other shapes that narrow in width in a direction away from the line path. The line, such as line 104 of FIGS. 1 and 2, may be squeezed between surfaces of the outer surface 142 and the inner body 144 into narrower portions of the groove 148. In this way, the line 104 may be compressed via contact with each side of the groove 148 in addition to the first surface 112 and/or the second surface 114. That is to say, previous line grabbing devices may include two surfaces within the groove, which may form a larger contact area relative to the contact point formed by the groove 148. The angle of the surface of the groove 148 with respect to the first surface 112 may increase a surface pressure relative to a cam without the groove.

FIG. 3B illustrates the triangular shape of the line 104 being pressed into the groove 148, which may further reduce a stress on an outer cover of the line by more evenly distributing pressure. The groove 148 may provide more contact area with the line which increases pressure while adding friction onto the line, thereby keeping the cam 130 energized. In one example, the line is maintained in a pre-determined location, such as a center of the cam, blocking the line from moving or biasing toward the outer surface 142 of the inner body 144. This may further maintain more balanced loads on the bearing 140.

In one example, the angled faces of the groove 148 may generate increased forces due to a wedging effect of the line. The groove 148 further includes three primary area of pressure onto the line 104, which may decrease cross-sectional distortion and resulting stressing against a sheath of the line 104. The V-shape of the groove 148 is further configured to provide a pre-determined path for the line 104 to travel through the cam 130. This may block the line 104 from migrating side to side during grabbing and slipping events. Side to side migration may result in a pinching of the line and off-centered forces being applied thereto. These off-centered forces may degrade the line while also increasing stresses on the bearing of the cam, thereby reducing a durability of the bearing and/or increasing maintenance costs.

Turning now to FIGS. 4A, 4B, 4C, 4D, and 4E, they show various positions of the cam 130 relative to the line 104. FIG. 4A illustrates a first position 400 with a first camming angle 402. In one example, the first position 400 is a starting position of the cam 130 and the first camming angle 402 is between 5 and 25 degrees. Additionally or alternatively, the first camming angle 402 may be between 15 and 25 degrees. In one example, the first camming angle 402 may be equal to about 20 degrees.

FIG. 4B illustrates a second position 410 with a second camming angle 412. The second position 410 may correspond to a more rotated position of the cam 130 relative to the first position 400 of FIG. 4A. However, in one example, due to the logarithmic shape of the protrusion 134 of the cam 130, the second camming angle 412 may be identical to the first camming angle 402.

FIG. 4C illustrates a third position 420 with a third camming angle 422. The third position 420 may correspond to a more rotated position of the cam 130 relative to the second position 410 of FIG. 4B. However, in one example, due to the logarithmic shape of the protrusion 134 of the cam 130, the third camming angle 422 may be identical to the second camming angle 412 and the first camming angle 402. In one example, the angle of the reaction force between the line 104 and cam remains constant, allowing the device to continually gab the line as the load increases and the rope may deform under pressure. The third camming angle 422, along with the first camming angle 402 and the second camming angle 412 of FIGS. 4A and 4B, may be measured based on a line extending from a center of a pivot point of the cam 130 to a contact point and to a surface normal to the line. Said another way, the camming angle is measured as the angle between two lines, a first line connecting the contact point of the cam on the line to the center of the cam's pivot point, and a second line that runs from the cam's pivot point and crosses the line at an orthogonal angle. The camming angle determines the relationship between the frictional force of the line on the cam and a pressure exerted by the cam on the line.

FIG. 4D illustrates a fourth position 430 with a fourth camming angle 432. The fourth cam position 430 may correspond to a more rotated position of the cam 130 relative to the third position 420 of FIG. 4C. The fourth camming angle 432 may correspond to a camming angle between a first contact point 434 and a second contact point 436. That is to say, the fourth camming angle 432 may correspond to a net or average contact point between the first and second contact points. The first contact point 434 may correspond to a camming angle similar to a camming angle of the first through third positions. The second contact point 436 may include a larger camming angle between 35 to 55 degrees. Thus, the fourth camming angle 432, which is based on an average of the first and second contact points 434, 436, may be between 20 and 50 degrees. In one example, the fourth cam position 430 corresponds to a first threshold position of the cam 130 at which the tail 132 may contact the line 104. While not illustrated in the example of FIG. 4D, the point at which the tail 132 contacts the line (e.g., the second contact point 436, may further comprise pressing the line into the second recess (e.g., second recess 111 of FIG. 1).

FIG. 4E illustrates a fifth position 440 with a fifth camming angle 442. The fifth position 440 may correspond to a more rotated position of the cam 130 relative to the fourth position 430 of FIG. 4D. In one example, the fifth position 440 corresponds to a most rotated position of the cam 130. The fifth camming angle 442 may be between 50 and 60 degrees. In one example, the fifth position 440 illustrates a change of the camming angle at a high degree of cam rotation. The camming angle shown is above a threshold angle so that the cam is unlikely or unable to grab the line. Thus, this amount of cam rotation may occur during fewer conditions than the camming angles of FIGS. 4A to 4D. The spring (e.g., spring 146 of FIG. 2) may urge the cam 130 in the direction of the line 104 such that once the line tension decreases the cam 130 may then re-grab the line. In one example, the fifth position 440 may correspond to a second threshold position in which the tail 132 blocks further rotation of the cam 130.

An embodiment of a device configured to couple to a line includes a cam shaped to increase a camming angle as rotation of the cam increases relative to a starting position, wherein the camming angle is from a center of a pivot point of the cam to a net contact point between the cam and the line and an axis orthogonal to the line. A first example of the device further includes where the cam comprises a tail configured to contact the line in response to the cam rotating beyond a first threshold position. A second example of the device, optionally including the first example, further includes where the tail blocks rotation of the cam beyond a second threshold position. A third example of the device, optionally including one or more of the previous examples, further includes where the cam comprises a groove, and wherein a shape of the groove increases in width in a direction away from a pivot point of the cam. A fourth example of the device, optionally including one or more of the previous examples, further includes where the groove comprises a plurality of teeth configured to contact the rope. A fifth example of the device, optionally including one or more of the previous examples, further includes where the cam and a baseplate interact with a rope, wherein the baseplate comprises a recess configured to support the line. A sixth example of the device, optionally including one or more of the previous examples, further includes where the cam includes a spring configured to initiate a turning motion of the cam, and wherein the cam further includes a tail configured to initiate slipping of the cam and block rotation of the cam beyond a threshold rotation.

An embodiment of a line grabbing device includes a cam with a V-shaped groove increasing in width away from a bearing of the cam, a spring configured to overturn the cam towards contact with a line extending through the V-shaped groove, and a non-logarithmic portion of the cam configured to block rotation of the cam beyond a threshold rotation. A first example of the line grabbing device further includes where the non-logarithmic portion is a tail, wherein the tail contacts a line at the threshold rotation and increases a camming angle of the cam. A second example of the line grabbing device, optionally including the first example, further includes where a load of the line decreases beyond the threshold rotation, and wherein the line slips. A third example of the line grabbing device, optionally including one or more of the previous examples, further includes where the cam grabs the line in response to the line load being less than a threshold load. A fourth example of the line grabbing device, optionally including one or more of the previous examples, further includes where the line grabbing device grabs and slips line without a user input. A fifth example of the line grabbing device, optionally including one or more of the previous examples, further includes where the cam is unlevered. A sixth example of the line grabbing device, optionally including one or more of the previous examples, further includes where the cam and a baseplate grab a line at a contact area, and wherein the baseplate comprises a recess at the contact area. A seventh example of the line grabbing device, optionally including one or more of the previous examples, further includes where wherein the non-logarithmic portion corresponds to an increased radius of a spiral shape of the cam.

An embodiment of a system for a line grabbing device including a line extending through an opening arranged between a groove of a cam and a recess of a baseplate, wherein the groove of the cam decreases in width in a direction away from the line. A first example of the system further includes where the groove comprises a V-shape, and wherein the line is configured to compress into a triangular shape as it extends through the groove. A second example of the system, optionally including the first example, further includes where the cam is unlevered, and wherein a tail of the cam blocks rotation of the cam greater than a threshold rotation, and wherein the cam is configured to slip the line in response to a line tension greater than a friction applied at a position corresponding to the threshold rotation. A third example of the system, optionally including one or more of the previous examples, further includes where the cam grabs the line in response to the line tension being equal to or less than the friction applied at the position. A fourth example of the system, optionally including one or more of the previous examples, further includes where a user provides no inputs when the cam grabs and slips the line.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device configured to couple to a rope, comprising:
a cam shaped to increase a camming angle as an angle of rotation of the cam increases relative to a starting position due to the cam rotating in a direction of rotation, wherein the camming angle is an angle between a first axis and a second axis, the first axis extending from a center of a pivot point of the cam to a net contact point of the cam, the second axis extending from the center of the pivot point and orthogonal to a line path extending tangentially from the net contact point, the net contact point being a point or an average of two or more points where the cam is configured to contact the rope at a given angle of rotation of the cam, wherein the cam comprises a protrusion shaped to maintain a same camming angle throughout a first range of angles of rotation of the cam and a tail configured to contact the rope in response to the cam rotating beyond the first range of angles of rotation, wherein the camming angle increases when the cam rotates beyond the first range of angles of rotation, wherein the cam comprises a transition region where the protrusion couples to the tail, wherein the camming angle increases when the net contact point includes the tail, and wherein the tail blocks rotation of the cam beyond a second angle of rotation.

2. The device of claim 1, wherein the cam comprises a groove, and wherein a shape of the groove increases in width in a direction away from the pivot point of the cam.

3. The device of claim 2, wherein the groove comprises a plurality of teeth configured to contact the rope.

4. The device of claim 1, wherein the cam and a baseplate are configured to interact with the rope, and wherein the baseplate comprises a recess configured to support the rope.

5. The device of claim 1, wherein the protrusion has a logarithmic shape and the cam includes a spring configured to initiate a turning motion of the cam in the direction of rotation such that when a load is placed on the rope by the device, the cam rotates in the direction of rotation and the protrusion contacts the rope to grab the rope and prevent slipping of the cam, wherein the tail has a non-logarithmic shape, and wherein, as the cam continues to rotate in the direction of rotation, the tail is configured to block rotation of the cam in the direction of rotation and initiate the slipping of the cam when the load on the rope overcomes friction between the cam and the rope.

6. A rope grabbing device, comprising:
 a cam comprising a protrusion having a logarithmic shape and a tail having a non-logarithmic shape, the cam further including a V-shaped groove increasing in width away from a bearing of the cam; and
 a spring configured to initiate a turning motion of the cam in a direction of rotation to urge the cam towards contact with a rope configured to extend through the V-shaped groove;
 wherein the tail of the cam is configured to block rotation of the cam beyond a threshold rotation, and wherein at a range of cam angles prior to the threshold rotation, only the protrusion is configured to contact the rope and, beyond the threshold rotation, both the tail and the protrusion are configured to contact the rope,
 wherein the spring is configured to initiate the turning motion of the cam in the direction of rotation such that when a load is placed on the rope by the rope grabbing device, the cam rotates in the direction of rotation and the protrusion contacts the rope to grab the rope and prevent slipping of the cam, and wherein, as the cam continues to rotate in the direction of rotation, the tail is configured to block rotation of the cam in the direction of rotation and initiate slipping of the cam when the load on the rope overcomes friction between the cam and the rope.

7. The rope grabbing device of claim 6, wherein the tail extends outward from the protrusion to a rounded tip of the tail, and wherein, between the protrusion and the rounded tip, the tail extends with a linear shape that forms the non-logarithmic shape of the tail.

8. The rope grabbing device of claim 6, wherein the rope is configured to slip when the load on the rope is greater than a threshold load and the tail blocks rotation of the cam beyond the threshold rotation.

9. The rope grabbing device of claim 8, wherein the cam grabs the rope in response to the load being less than the threshold load.

10. The rope grabbing device of claim 6, wherein the rope grabbing device is configured to grab and slip the rope without a user input.

11. The rope grabbing device of claim 6, wherein the cam is unlevered.

12. The rope grabbing device of claim 6, wherein the cam and a baseplate are configured to grab the rope at a contact area, and wherein the baseplate comprises a recess at the contact area.

13. The rope grabbing device of claim 12, wherein the tail corresponds to an increased radius of a spiral shape of the cam, relative to a radius of the protrusion.

14. A system, comprising:
 a rope grabbing device comprising an unlevered cam and a baseplate, the cam having a protrusion and a tail extending from the protrusion with a linear shape from the protrusion to a rounded tip of the tail; and
 a rope extending through an opening arranged between a groove of the cam and a recess of the baseplate, wherein the groove of the cam decreases in width in a direction away from the rope, wherein the tail of the cam blocks rotation of the cam greater than a threshold rotation, and wherein the cam is configured to slip the rope in response to a force on the rope applied by the rope grabbing device being greater than a friction applied on the rope by the rope grabbing device at a position corresponding to the threshold rotation.

15. The system of claim 14, wherein the groove comprises a V-shape, and wherein the rope is configured to compress into a triangular shape as it extends through the groove.

16. The system of claim 14, wherein the cam grabs the rope in response to the force being equal to or less than the friction applied at the position.

17. The system of claim 16, wherein the cam is configured to grab and slip the rope without user input.

* * * * *